US009427778B2

(12) United States Patent
Ryan

(10) Patent No.: US 9,427,778 B2
(45) Date of Patent: Aug. 30, 2016

(54) HEADLIGHT RESTORATION KIT

(75) Inventor: John Ryan, Missoula, MT (US)

(73) Assignee: Search Automotive Technologies, LLC, Palm Beach Gardens, FL (US)

( * ) Notice: Subject to any disclaimer, the term of this patent is extended or adjusted under 35 U.S.C. 154(b) by 270 days.

(21) Appl. No.: 12/908,608

(22) Filed: Oct. 20, 2010

(65) Prior Publication Data

US 2012/0097100 A1 Apr. 26, 2012

(51) Int. Cl.

| | |
|---|---|
| ***C08F 2/46*** | (2006.01) |
| ***B05D 7/02*** | (2006.01) |
| ***F21S 8/10*** | (2006.01) |
| *B05D 3/06* | (2006.01) |
| *B05D 3/12* | (2006.01) |

(52) U.S. Cl.

CPC ................. *B05D 7/02* (2013.01); *F21S 48/31* (2013.01); *B05D 3/067* (2013.01); *B05D 3/12* (2013.01)

(58) Field of Classification Search

CPC ......... F21S 48/31; B05D 3/12; B05D 3/067; B05D 7/02

USPC ......................................................... 427/487

See application file for complete search history.

(56) References Cited

U.S. PATENT DOCUMENTS

| | | | | |
|---|---|---|---|---|
| 4,954,591 | A | 9/1990 | Belmares | |
| 5,035,920 | A * | 7/1991 | Smrt et al. | 427/202 |
| 5,443,604 | A | 8/1995 | Stowell | |
| 5,633,049 | A | 5/1997 | Bilkadi et al. | |
| 6,244,707 | B1 | 6/2001 | Faubl | |
| 6,306,502 | B1 | 10/2001 | Fukushima et al. | |
| 6,846,567 | B1 | 1/2005 | Ekinaka et al. | |
| 6,984,612 | B2 | 1/2006 | Maillie | |
| 7,045,001 | B1 | 5/2006 | Kropp et al. | |
| 7,163,446 | B1 | 1/2007 | Cole | |
| 7,404,988 | B2 | 7/2008 | Kuta | |
| 7,713,628 | B2 | 5/2010 | Botrie et al. | |
| 7,793,786 | B2 | 9/2010 | Shadwell | |
| 2001/0008691 | A1 | 7/2001 | Isogai et al. | |
| 2005/0154076 | A1 * | 7/2005 | Bach et al. | 522/8 |
| 2007/0133098 | A1 | 6/2007 | Young | |
| 2009/0042761 | A1 | 2/2009 | Zeisbrich et al. | |
| 2009/0087551 | A1 * | 4/2009 | Parsons | 427/140 |
| 2009/0148606 | A1 | 6/2009 | Norville | |
| 2009/0176678 | A1 | 7/2009 | Zeisbrich et al. | |
| 2011/0027472 | A1 * | 2/2011 | Howell | 427/162 |

* cited by examiner

*Primary Examiner* — Robert S Walters, Jr.

(74) *Attorney, Agent, or Firm* — McHale & Slavin, P.A.

(57) ABSTRACT

A method and kit for restoration of a plastic headlight surface including the steps of conditioning a headlight surface by wet sanding with 600 grit sandpaper effective to remove a laminate coating, wiping the headlight surface with a lint free towel, cleaning the headlight surface with an alcohol treated towel, coating the headlight surface with an ultra violet light curable restoration formulation comprising aliphatic urethane acrylate in the range of 25% to 60%, a photoinitiator in the range of 1% to 5%, N-butyl acetate in the range of 5% to 25%, Toluene in the range of 3% to 15%, a Methyl isobutyl ketone in the range of 3% to 15%, a light stabilizer in the range of 1% to 5%, and includes a flow agent; and exposing the coated headlight surface to an ultra-violet light for at least 10 minutes. In the preferred embodiment, the formulation includes a hydrocarbon propellant and is applied from a spray can.

1 Claim, 1 Drawing Sheet

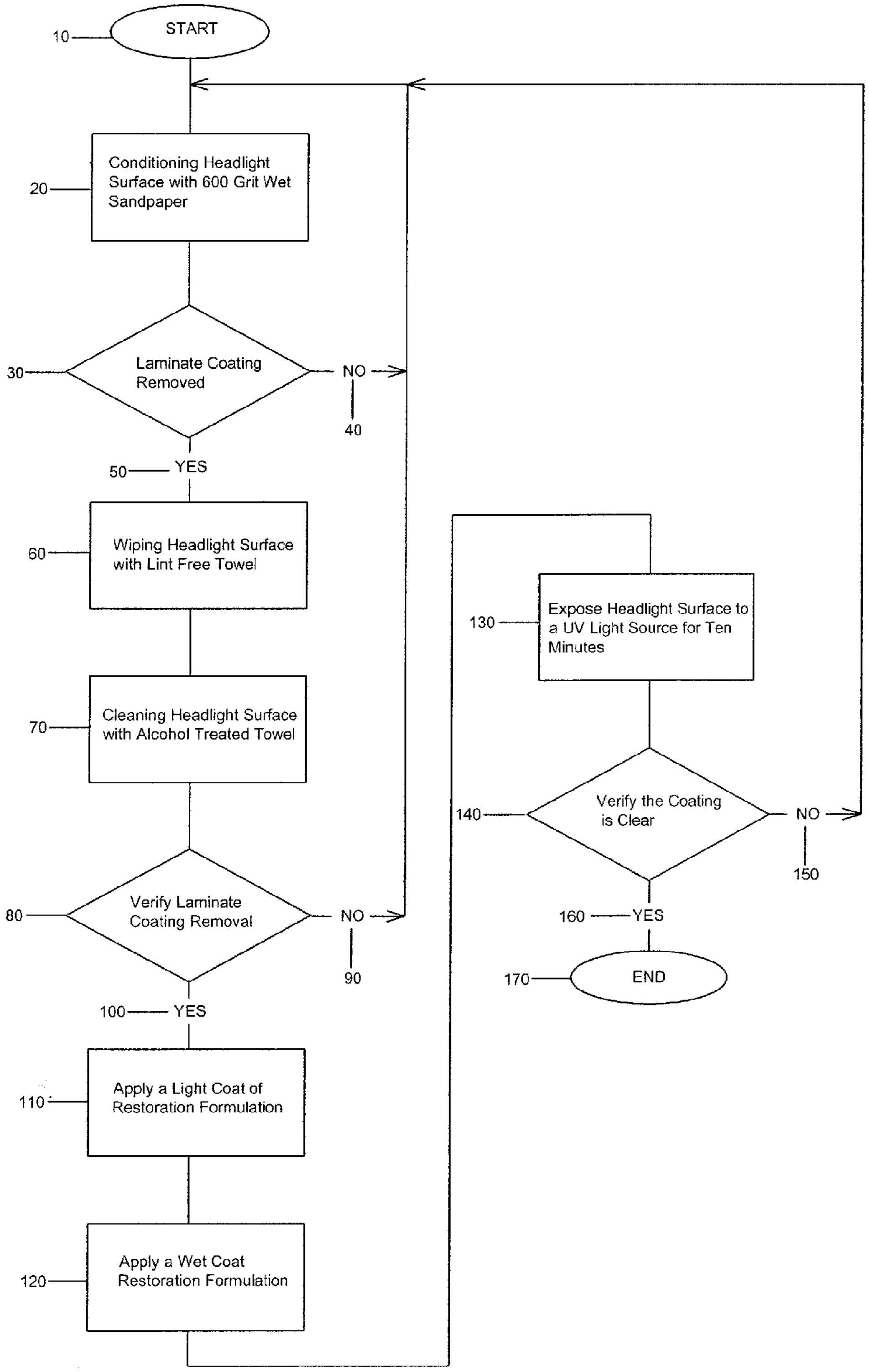
START
10
Conditioning Headlight Surface with 600 Grit Wet Sandpaper
20
Laminate Coating Removed
30
NO
40
YES
50
Wiping Headlight Surface with Lint Free Towel
60
Cleaning Headlight Surface with Alcohol Treated Towel
70
Verify Laminate Coating Removal
80
NO
90
YES
100
Apply a Light Coat of Restoration Formulation
110
Apply a Wet Coat Restoration Formulation
120
Expose Headlight Surface to a UV Light Source for Ten Minutes
130
Verify the Coating is Clear
140
NO
150
YES
160
END
170

HEADLIGHT RESTORATION KIT

FIELD OF THE INVENTION

The invention is related to headlight restoration and, in particular, to a kit for use in headlight restoration including an aliphatic urethane acrylate with a photoinitiator.

BACKGROUND OF THE INVENTION

A majority of the headlights manufactured today are constructed of plastic, namely polycarbonate. Polycarbonate is lightweight, has excellent impact resistance and clarity, and is easy to mold into various shapes. However, polycarbonate laminates are known to discolor during prolonged exposure to the elements. The discoloration is typically surface located if treated before structural integrity becomes an issue. However, even discoloration of the surface causes the clarity of the plastic to degrade causing a dramatic reduction in light transfer through the plastic and forming an aesthetically unpleasing appearance. While plastics typically include an ultra-violet light inhibitor to reduce the rate of structural breakdown, inhibitors lose their ability to continue to protect the material over time with the laminate coating being the first to suffer.

While the discoloration of the lens is visually unpleasing, a safety concern arises in the operation of a vehicle having discolored headlight lens at night. On-coming traffic may believe the vehicle is farther away if the headlights are dim. The operator of the vehicle will have reduced illumination which can endanger the operator and their occupants should the speed of the vehicle be increased beyond the range of headlight illumination.

Replacement of the lens is possible, however, it is an expense that few vehicle owners are willing to spend. Another option is restoration of the lens, which is possible if the restoration is performed before structural degradation of the plastic has occurred.

To address the loss in clarity and associated reduction in safety, numerous treatments to the plastic have been introduced to the market. Basic plastic restoration consists of sanding off the oxidation and then coating the lens with a material. Unfortunately the known plastic restorations are either temporary, difficult to apply, or result in a treatment that accelerates the problem.

U.S. Pat. No. 4,954,591 discloses polymerizable and cross-linkable, radiation curable coating composition designed for deposition as a tintable coating. The formulation is a mixture including: (a) 25-94% by weight of a polyfunctional acrylate or methacrylate monomer having at least three acrylate functional groups per molecule or a mixture of such monomers; (b) 3-50% by weight of a monomer selected from N-vinyl derivatives of linear or cyclic secondary amides, tetrahydrofurfuryl acrylate or methacrylate, N,N-di(lower alkyl) acrylamide ethylenically unsaturated monosilane, or a mixture of such monomers; and (c) 3-40% by weight of an ethylenically unsaturated monomer having a Tg less than 80 degrees C. or 3-30% of an ethylenically unsaturated copolymer with a Tg less than 100 degrees C. Ultra-violet radiation is supplied by a 6-inch 200 watt/inch mercury lamp.

U.S. Patent Appl. No. 2001/0008691 discloses a UV curable resin composition for coating the surface of a poly-carbonate resin molded article such as a lamp cover for automobiles. In the UV curable resin composition for coating (a) 10-70 wt. % of a mono- or bi-functional monomer having a molecular weight of 130-700, and having ether bond and one or two acryloyloxy groups per molecule, (b) 5-60 wt. % of an aliphatic urethane acrylate oligomer, (c) 10-30 wt. % of a methyl methacrylate polymer having a molecular weight of 10000 to 200000, as necessary, and (d) 5-50 wt. % of a polyfunctional monomer having a weight of 250-700 and having three or more acryloyloxy groups per molecule, mixed 2-10 parts by weight of a photopolymerization initiator, and 2-20 parts by weight of a UV absorber.

U.S Patent Appl. No. 2009/0148606 discloses a restoration kit for the plastic light cover on an automobile or other plastic surface. The kits and methods utilize polishing compositions having particles selected so as to polish a plastic surface, and a UV protective composition such as an acrylic polymer that forms a UV protective coating. The polishing compositions may include agglomerated abrasive particles dispersed in a liquid or gel carrier that progressively break down in size when exposed to oxygen and mechanical pressuring during polishing.

U.S. Pat. No. 6,984,612 discloses an automotive headlight restorer and cleaner which removes oxidation. The method of manufacture consists of an industrial degreasing compound, a mixture of about 53% mineral spirits, 3% butanol, and gloss spar varnish and/or acrylic urethane. One solution is used on lenses with heavy oxidation and severe damage and the other solutions are for lenses with less severe oxidation and damage.

U.S. Pat. No. 7,045,001 discloses a kit and method to resurface and restore plastic material, and in particular, the plastic lens covers over the headlights of an automobile. The kit includes a pretreatment formulation, a resurfacing formulation, and a restoration formulation. The restoration formula includes an aqueous polymer such as methyl methacrylate and ethyl methacrylate.

U.S. Pat. No. 7,163,446 discloses a method of restoring a discolored automobile headlight lens by first sanding the outer surface of the lens with successively finer grit wet sanding disks until a smooth surface is achieved exhibiting no discoloration. The surface is then polished with an aqueous paste abrasive polish containing aluminum oxide abrasive particles. The outer surface of the lens is then sprayed with a film forming aqueous polymer dispersion containing an ultraviolet protectant. The sealer comprises of acrylic urethane copolymers, Hindered Amine Light Stabilizers, benzotriazole UV light absorbers, 1-methyl-2-pyrrolidone, and dipropylene glycol monomethyl ether.

U.S. Pat. No. 7,404,988 discloses refinishing an exterior automotive lens having a damaged exterior surface in situ using a continuous movement and oscillating motion, with first, a 320 grit sanding disc, next a 600 grit sanding disc, and finally a 1500 grit sanding pad while flushing the surface with water to prevent melting of the surface. The surface is then buffed with a polishing compound until a high gloss is achieved. Finally, the surface is coated with a transparent ultraviolet hardenable coating material, and hardened by exposure to an ultraviolet light source. The claim is limited to the use of an oscillator device having a rotational oscillating motion.

U.S. Pat. No. 7,713,628 discloses a cured coating or molded article prepared from a composition comprising an actinic-radiation curing polymer, wherein the composition is cured with actinic radiation at a temperature of at most 150 degree C. to form the cured coating or molded article; wherein the cured coating or molded article has a thickness of at least about 0.5 mm and a hardness of about Shore A 90 to about Shore D 90.

U.S. Pat. No. 5,443,604 discloses a polishing compound for plastic surfaces. The compound contains by weight approximately 4 to 17 parts. At least one petroleum distillate lubricant, 1 to 6 parts mineral spirits, 2.5 to 15 parts abrasive particles, and 2.5 to 10 parts water. The abrasive is tripoli or a similar material that contains fine particles silica. Preferably, most of the abrasive particles are less than approximately 10 microns, more preferably less than approximately 5 microns in size.

U.S. Pat. No. 5,633,049 discloses an acid-resistant and abrasion resistant protective coating for thermoplastic transparencies, particularly aircraft transparencies. The coating is prepared from a silica-free protective coating precursor composition comprising a multifunctional ethylenically unsaturated ester of acrylic acid, a multifunctional ethylenically unsaturated ester of methacrylic acid, or a combination thereof; and an acrylamide.

U.S. Pat. No. 6,244,707 discloses contact lenses, intraocular lenses and transparent plastic with enhanced UV blocking to meet ANSI Class 1 specifications including effective amounts of two different UV absorbing compounds. One UV absorber is a benzotriazole derivative, and the other UV absorber is a benzophenone derivative. The lenses are made from a polymer that incorporates both of these UV absorbers.

U.S. Pat. No. 6,306,502 discloses a coating composition forming an abrasion resistant coating comprising an ultraviolet-curable silicone prepared by chemically modifying particulate colloidal silica with a specific compound, a monomer mixture comprising a (meth) acrylate having a specific isocyanate skeleton and a urethane poly(meth)acrylate having an alicyclic skeleton, and a photo-polymerization initiator.

U.S. Pat. No. 6,846,567 discloses a surface-protected plastic composite material comprising a transparent plastic, a coating layer as a first layer stacked on the transparent plastic and a thermally cured coating layer as a second layer stacked on the first layer, the coating layer (I) being formed of a resin composition containing at least 50% by weight, based on the resin content thereof, of an acrylic resin which is an acrylic resin containing at least 50 mol % of recurring unit based on an alkyl methacrylate, the thermally cured coating layer (II) being made of an organosiloxane resin formed from the following components a, b and c, (A) colloidal silica (component a), (B) a hydrolysis condensate (component b) of a trialkoxysilane, (C) a hydrolysis condensate (component c) of a tetraalkoxysilane, the organosiloxane resin containing 5 to 45% by weight of the component a, 50 to 80% by weight of the component b, and 2 to 30% by weight of the component c, and use of the composite material as a window glass.

U.S. Pat. No. 7,793,786 discloses a method to coat vehicular plastics with an epoxy coating. One embodiment includes a system that may be used to remove damaged plastic and any existing hard coat material, such as silicone, from the surface of a vehicular plastic. Such embodiments may also include the epoxy coating and tools necessary for applying the epoxy. Another embodiment discloses a process for preparing and sealing a vehicular plastic with an epoxy coating.

U.S. Patent Appl. No. 2007/0133098 discloses the Headlight Detailer (HLD) as a three part process utilizing specific compounds and a procedure for the purpose of detailing automobile headlights and restoring the functionality of the headlight lens. The first part of the process consists of using readily available glass cleaner applied to the headlight lens for initial cleaning. The second step in the process is applying an ammonia and silicone based solution for the purposes of enhanced cleaning and surface preparation. The third and final step in the process includes the application of a wax sealer containing a solution for regenerating the hardened acrylic resin lens surface coating and UV protection.

U.S. Patent Appl. No. 2009/0042761 discloses a solution for cleaning plastic headlight covers that includes an oily acid, a surfactant, a citrus turpene and hard nanoparticles of sapphire and diamond. Principal ingredients are carried by commercial windshield cleaning solution or in water.

U.S. Patent Appl. No. 2009/0176678 discloses a cleaning solution for plastic headlight covers which includes a saturation of crystallizable salts, such as ammonium sulfate or urea; an organic solvent, such as turpene, glycol ether or alkyl alcohol; a buffered acid to maintain pH between 3.0 and 5.5, such as citric acid, oxalic acid, sodium bisulfate, or boric acid; alumina nanoparticles of 0.05 micron size and other submicron sizes; as well as a sequestering (chelating) agent, surfactant, and hydrophilic combiner; all in an aqueous solution. The cleaning solution effectively removes the mineral solids from the crazed surface of a plastic headlight cover that form a base for accumulating organic residue and road grime. No abrasive scouring or recoating of the surface with an acrylic sealant is required.

SUMMARY OF THE INVENTION

The instant invention is a restoration kit for vehicle headlights having plastic lens covers. Over time, and exposure to the elements, many plastic lenses discolor due to dust, dirt, scratches, ultra violet exposure, and oxidation of the surface. The restoration kit provides a method of preparing the surface of the plastic for treatment, namely by removing the oxidation and all other contaminants from the plastic lens. The restoration kit further provides a spray-on restoration formulation based on aliphatic urethane acrylate that is cured by exposure to ultra-violet light. In the preferred embodiment, the restoration formulation comprises the aliphatic urethane acrylate in combination with a photoinitiator, N-butyl acetate, Toluene and Methyl isobutyl ketone.

Accordingly, it is an objective of the instant invention to provide a method of restoring a headlight lens that is easy to apply, aesthetically pleasing and has long lasting performance.

It is another objective of the instant invention to provide a method of repairing or restoring a headlight lens that is permanent and requires only a few application steps.

Another objective of the instant invention is to provide a method of restoring a headlight lens having permanent UV-A absorbers.

Still another objective of the instant invention is to provide a method of restoring a headlight lens including ultraviolet drying agents for a quick evacuation of solvents.

Yet still another objective of the instant invention is to provide a method of restoring a headlight lens by use of a “Spray On” application process.

It is a further objective of the instant invention to provide a method of restoring a headlight lens by use of an ultraviolet radiation cured coating.

Yet another objective of the invention is to disclose a headlight restoration kit that allows for restoration of the plastic lens without removal of the lens from the vehicle.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DESCRIPTION OF THE DRAWINGS

FIG. 1 is a flow chart illustrating the process of headlight restoration.

DETAILED DESCRIPTION OF THE INVENTION

The following is a detailed description of an example embodiment of the invention depicted in the accompanying drawing. The example embodiment is in such detail as to clearly communicate the invention. However, the amount of detail offered is not intended to limit the anticipated variations of embodiments wherein the instant formulation may be used on new plastic as well as plastic in need of restoration, as well as cover modifications, equivalents, and alternatives falling within the spirit and scope of this specification and appended claims. The detailed description below is designed to make such embodiments obvious to one skilled in the art.

The restoration kit of the instant invention requires the plastic lens of the headlight be prepared for receipt of a restoration formulation (10). The plastic headlight surface is prepared by first conditioning the headlight surface by removing the contaminated laminate coating, or removing a contaminated and possibly oxidized surface by wet sanding (20). The wet sanding is performed with 600 grit sanding paper with sanding movement in a vertical and horizontal pattern. The sanding paper is kept wet at all times and circular motions are not recommended. A dual action sander may be used with experience, but an orbital type sander is not recommended. The sanding process is performed using medium pressure until the oxidized laminate is removed. It is noted that an original laminate coating turns amber with age; the sanding will remove the old, damaged laminate. It should further be noted that the use of various grades of sandpaper to accomplish the laminate removal is possible, but does not improve the efficiency of the instant invention or the resulting quality. For instance, progression of paper grades from 220 to 400 to 600 to 800 can be used, but the time spent in smoothing out the surface with the finer grades does not increase the quality of results. Further, while a surface sanded with 2000 grit sandpaper is smoother than 600 grit sandpaper, the restoration formulation of the instant invention does not require a smoother surface than that offered by 600 grit sandpaper. The surface structure left from use of the 600 grit sandpaper provides a more suitable attachment surface for the formulation. The wet sanding continues until the laminate coating is removed (30).

Water is preferably used to clear the surface from sanding residual. If the wet sanding does not remove the laminate coating (40) the process is continued until the laminate is removed. If the laminate coating is removed (50) then a lint free towel is used to dry the residual free surface and assure that the surface is free of dirt, grime and sanding residual (60). The lint free cloth assures that no particles of lint become attached to the lens. The lens will appear cloudy due to the microscopic scratches caused during the coating removal, however, the restoration formulation will fill in the imperfections caused during the sanding procedure.

Once the lens has been dried, an alcohol treated towel is used to assure all contaminates have been removed (70). In addition, the alcohol treated towel can be used to verify removal of any residues and surface contaminates. The headlight surface is reinspected at this point (80), and if the surface indicates any laminate remains, the wet sanding process is repeated (90), followed by the rinse, dry and alcohol towel which help reveal if any laminate remains.

If the alcohol leaves the surface with a dull finish, but free of oxidation, the laminate has been removed (100) and the headlight surface is then coated with a restoration formula having an ultra violet light curable formulation. Aliphatic urethane acrylate in the range of 25% to 60% and a photoinitiator in the range of 1% to 5% provide a base. N-butyl acetate in the range of 5% to 25%, Toluene in the range of 3% to 15% and Methyl isobutyl ketone in the range of 3% to 15% result in a coating that will not degrade over time. A light stabilizer in the range of 1% to 5% and a flow agent allows for placement of the formulation in a spray container using a hydrocarbon propellant.

In application, a light tack coat and then a final wet coat provides the proper coating. As the formulation is curable upon exposure to ultraviolet radiation, the coatings need to be applied out of direct sunlight. Application of the formulation in a spray pattern requires the spray be applied perpendicular to the lens surface. With a lens that has curved ends or edges, the spray pattern should follow the curvature to prevent angling of the spray pattern. A very light spray patter, tack coat, is applied to the lens (110). After about 30 seconds, a second coating is sprayed from a distance of about five inches from the surface of the lens forming a wet coat application (120).

The coating is then curable by use of a UV-A light (130) which is positioned approximately 3-5 inches from the lens surface. Alternatively, the coating can be cured by placement in direct sunlight. If the coating is not clear and smooth, the application process was likely flawed. Dry or cure the lens in the direct rays of the sun or use the UV-A tripod and then repeat the process after removing (150) the new lens coating. If the coating is clear and smooth (160), the vehicle can be driven after exposure to the UV light source and the lens can then be commercially washed after 24 hours of cure time (170).

TEST—Long term efficacy

Q-LABORATORIES INC., was retained using test method SAE J2527 2004-02 (nationally mandated to verify longevity on outside of vehicles) to determine long term efficacy of the coating.

Number of Specimens:

Specimen ID

1. Toyota treated
2. Ford treated
3. Chevrolet treated
4. G6 treated
5. Lexus treated The test used accelerated weathering with Zenon Arc Lamps.

The test exposed the coating of the instant invention for 2500 KJ/M2 (2500 kilojoules).

Results reported on the headlamps removed from older cars no longer in service.

Q-LAB REPORT

The standard scale used to evaluate observable changes is a "1-10".

1-2 Change is so minimal that it cannot be detected by the naked eye, only by a special measuring device 3-4 Minimal change that could only be recognized by a trained eye 5 Change that can be slightly noticed 6-7 A moderate change that is growing 8-10 A pronounced change to severe Zenon Accelerated Weathering.

After accelerated weathering in the Q-Sun Xenon Test Chamber for 2500 KJ/M2, it was observed that the average "difference" noted in the five vehicle lenses having been restored by use of the instant invention was in the range of 0.98 to 2.31, a change that could not be detected by the human eye. The test supports long term efficacy of the coating.

Test Date: 30 Jun. 2010

Duration 1875 $kJ/m^2$

Exposure Xenon Arc lamps, 0.55 $W/m^2$, Daylight—B/B filters

| Specimen ID | Original | Present | Difference |
|---|---|---|---|
| 1—Toyota | 6.11 | 8.42 | 2.31 |
| 2—Ford | 4.11 | 5.37 | 1.26 |
| 3—Chevrolet | 7.59 | 8.57 | 0.98 |
| 4—G6 | 7.56 | 9.62 | 2.06 |
| 5—Lexus | 3.44 | 5.05 | 1.61 |

Example: UV degradation over time. Analysis of a particular case showed a 3,000 candela reading on low beam and 7,000 candela reading on high beam. Degradation of the hard coat on the polycarbonate (PC) is blocking the transmission of light from the internal headlamp bulb. When the headlight lens was refinished with the proper sealer technology, the headlight lens survey showed 7,000 candela reading on low beam and 17,000 candela reading on high beam.

| | Appln | 3M | BG | VEW | DVP | HRD |
|---|---|---|---|---|---|---|
| Lifetime Warranty (Lab Test) | YES | NO | NO | NO | NO | NO |
| Spray on Application | YES | NO | NO | NO | NO | YES |
| Quick and Easy to Apply | YES | NO | NO | NO | NO | YES |
| Requires Wax Sealer Periodically | NO | N/A | N/A | YES | YES | N/A |
| Temperature Sensitive Application | NO | N/A | N/A | YES | YES | NO |
| Even Coverage on Sealer | YES | N/A | NO | NO | NO | YES |
| Lab Test SAE J2527 2004-02 | YES | N/A | N/A | NO | N/A | NO |
| Cures with UVA | YES | N/A | NO | NO | NO | NO |
| One Time Permanent Solution | YES | NO | NO | NO | NO | NO |
| Chemicals for pretreatment | NO | YES | UKN | NO | YES | NO |

Headlight restoration products on the market include 3M Headlight Lens Restoration which makes no claims as to the longevity of the technology, typically lasts only 5-10 months. 3M has no warranty and the lens clarity is temporary; clear for a few months then "cloudiness" returns. The product requires eleven steps and 30-40 minutes to complete.

BG's is used by a number of automobile dealers that also use BG's care and appearance products. BG has a five step process that takes 20-30 minutes to complete. The process uses power equipment to sand, buff and polish, and requires a hair dryer after the sealer is smeared on to improve final effect. Substantial buffing and polishing after removal of the damaged laminate is required. BG's warranty is described as "will last as long as original finish."

Crystal View is an earlier generation headlight restoration technology which is very labor intensive, uses a "smear on" or wipe on process with their sealer application that can lead to streaks or overlap on the finish. The product is sensitive to temperature at the time of application and can cure too quickly compounding the possibility of mistakes. The product does not protect against ultra-violet light.

Dvelup Headlight Restoration Product has multiple steps including three grades of sandpaper, use of chemical and compounds to prepare lens for sealant, reflective of a "thin" sealant. Sealant is a foam brush smear on application. Drying time is based on temperature and may take up to 40 minutes if the temperature is between 20 and 50 degrees. The application of wax may be needed at least twice a year to protect against damage. Dvelup offers no factor warranty, but recommends that the distributor decides what warranty, if any, should be offered.

HeadlightRenewDoctor employs sandpaper and water for removal of damaged laminate process. A sealer is employed that cures without UVA, such as a clear coat.

| | Appln | MEG | MOC | PTX | RNX | SYM | WYN |
|---|---|---|---|---|---|---|---|
| Lifetime Warranty (Lab Test) | YES | NO | NO | NO | NO | NO | YES |
| Spray on Application | YES | NO | NO | NO | YES | NO | NO |
| Quick and Easy to Apply | YES | YES | NO | NO | NO | NO | NO |
| Requires Wax Sealer Periodically | NO | N/A | N/A | N/A | YES | YES | NO |
| Temperature Sensitive Application | NO | N/A | N/A | N/A | UKN | NO | NO |
| Even Coverage on Sealer | YES | N/A | NO | NO | NO | YES | NO |
| Lab Test SAE J2527 2004-02 | YES | N/A | NO | NO | NO | NO | NO |
| Cures with UVA | YES | N/A | NO | NO | NO | NO | NO |
| One Time Permanent Solution | YES | NO | NO | NO | NO | NO | NO |
| Chemicals for pretreatment | NO | NO | NO | YES | YES | YES | YES |

Meguiars Headlight Restoration employs an abrasive compound applied by a polishing pad, followed with a microfiber towel. No lens sealer is provided.

MOC Headlight Restoration uses a thin lens sealer with various grades of wet sandpaper to remove damaged laminate. The process takes 40 minutes to complete, and a thin sealer is smeared on by foam applicator.

Permatex Headlight Restoration Products use a very thin sealer, requiring 4 different types of abrasive sheets to remove the damaged lens coating and scratches. The process takes 40 minutes using a single 600 grit. A smear on foam pad-coating typically lasts up to one year or less according to reports from the field.

Rain-X Headlight Restoration uses a chemical to rinse the headlights. Three pads with lubricant are used in the removal process with buffing until clarity is observed.

Symtech Headlight Restoration is first prepared by use of 1500 and 2000 grit sandpaper. A polishing compound is used to remove scratches from earlier removal of damaged laminate. A sealer transfers from paper to a very thin film. Periodic waxing is required to maintain appearance.

Wynn's Headlight Restorer takes about 30 minutes to prepare and requires sandpaper with multiple grades of grit. An abrasive paste is employed after sanding. Polishing of lenses is required and a foam brush is used to smear on a sealant.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific foam or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A restoration kit for a plastic headlight surface consisting of:

at least one sheet of 600 grit sandpaper, said sandpaper for conditioning a headlight surface by wet sanding to remove a laminate coating placed upon a headlight surface;

at least one lint free towel, said towel used for wiping said headlight surface after wet sanding; and a sprayer containing a curable aliphatic urethane acrylate restoration formulation comprising a aliphatic urethane acrylate in the range of 25% to 60%, a photoinitiator in the range of 1% to 5%, n-butyl acetate in the range of 5% to 25%, toluene in the range of 3% to 15%, and methyl isobutyl ketone in the range of 3% to 15%, a light stabilizer in the range of 1% to 5% and a flow agent for placement of said restoration formulation in said sprayer, said sprayer having a hydrocarbon propellant for use in coating of the sanded and wiped headlight surface; wherein said restoration formulation sprayed upon the headlight surface to provide a coating that is cured upon exposure to ultraviolet light.

* * * * *